United States Patent
Kumar (10) Patent No.: US 7,899,699 B1
(45) Date of Patent: Mar. 1, 2011

(54) SYSTEM AND METHOD FOR ADAPTIVE FORECASTING

(75) Inventor: Praveen Kumar, Fort Worth, TX (US)

(73) Assignee: American Airlines, Inc., Fort Worth, TX (US)

( * ) Notice: Subject to any disclaimer, the term of this patent is extended or adjusted under 35 U.S.C. 154(b) by 1443 days.

(21) Appl. No.: 10/981,902

(22) Filed: Nov. 4, 2004

(51) Int. Cl.
G06F 17/30 (2006.01)

(52) U.S. Cl. .............. 705/10; 705/7; 705/8; 705/9

(58) Field of Classification Search ............. 705/7–10
See application file for complete search history.

(56) References Cited

U.S. PATENT DOCUMENTS

| | | | | |
|---|---|---|---|---|
| 5,255,184 | A * | 10/1993 | Hornick et al. | 705/6 |
| 5,270,921 | A * | 12/1993 | Hornick | 705/6 |
| 5,615,109 | A * | 3/1997 | Eder | 705/8 |
| 5,712,985 | A * | 1/1998 | Lee et al. | 705/7 |
| 5,897,620 | A * | 4/1999 | Walker et al. | 705/5 |
| 5,918,209 | A * | 6/1999 | Campbell et al. | 705/5 |
| 5,953,707 | A * | 9/1999 | Huang et al. | 705/10 |
| 6,085,164 | A * | 7/2000 | Smith et al. | 705/5 |
| 6,151,582 | A * | 11/2000 | Huang et al. | 705/8 |
| 6,611,726 | B1 * | 8/2003 | Crosswhite | 700/99 |
| 6,801,908 | B1 * | 10/2004 | Fuloria et al. | 1/1 |
| 6,804,658 | B2 * | 10/2004 | Lim et al. | 705/10 |
| 6,910,017 | B1 * | 6/2005 | Woo et al. | 705/10 |
| 7,080,026 | B2 * | 7/2006 | Singh et al. | 705/10 |
| 7,392,157 | B1 * | 6/2008 | Delurgio et al. | 702/181 |
| 7,644,009 | B2 * | 1/2010 | Amerasinghe et al. | 705/10 |
| 2002/0120492 | A1 * | 8/2002 | Phillips et al. | 705/10 |
| 2002/0169657 | A1 * | 11/2002 | Singh et al. | 705/10 |
| 2003/0115093 | A1 | 6/2003 | Lim et al. | |
| 2005/0096964 | A1 * | 5/2005 | Tsai | 705/10 |

OTHER PUBLICATIONS

"Revenue Management Without Forecasting of Optimization: An Adaptive Algorithm for Determining Airline Seat Protection Levels" (Garrett van Ryzin and Jeff McGill; Management Science, vol. 46, No. 6 (Jun. 2000), pp. 760-775 Published by: Informs).*

"Application of a Probabilistic Decision Model to Airline Seat Inventory Control" (Peter P. Belobaba; Operations Research, vol. 37, No. 2 (Mar.-Apr. 1989), pp. 183-197 Published by: Informs).*

Sabre; Airline Solutions; Resource Management Products; Staff Level Forecasting; http://www.sabreairlinesolutions.com/products/operation/resource.htm, Oct. 28, 2004.

(Continued)

*Primary Examiner* — Lynda C Jasmin
*Assistant Examiner* — Alan Miller
(74) *Attorney, Agent, or Firm* — Haynes and Boone, LLP (57) ABSTRACT

A system and method for adaptive forecasting is provided. A model file containing a forecast model is generated. A calibration type that correspond to a symbol and a key in the forecast model is determined, and the model file is stored in a database. A request for a forecast based on the symbol and the key is received. The model file is retrieved from the database and a forecast is calculated using the forecast model.

12 Claims, 9 Drawing Sheets

OTHER PUBLICATIONS

Sabre; Airline Solutions; Planning and Scheduling; Schedule Profitability Forecasting; http://www.sabreairlinesolutions.com/products/operation/planning.htm, Oct. 28, 2004.

SAS; Econometrics, Time Series Analysis & Forecasting; http://www.sas.com/technologies/analytics/forecasting, Oct. 28, 2004.

SAS; SAS High-Performance Forecasting; http://www.sas.com/technologies/analytics/forecasting/hpf, Oct. 28, 2004.

i2; Sales Volume and Option Forecasting; http://www.i2.com/solutionsbyindustry/sixone/automotive/indCDMSalesVolume.cfm, Nov. 3, 2004.

PROS Revenue Management; Advanced Revenue Management; http://www.prosrm.com/new_content/Advanced_Revenue_Mgmt.htm, Oct. 28, 2004.

* cited by examiner

Model File (28)

| Symbol ID (30) | Symbol (32) | Key (34) | Permanent Component (36) | Trend Component (38) | Seasonal Component (40) | Permanent Smoothing Constant (42) | Trend Smoothing Constant (44) | Seasonal Smoothing Constant (46) | Outlier Minimum (48) | Outlier Maximum (50) | Calendar ID (52) |
|---|---|---|---|---|---|---|---|---|---|---|---|
| 1 | bookings | flights with 8am departure | 85 | 0.5 | Mon: -10<br>Tues: +5<br>Wed: +2<br>Thurs: +3 | 10% | 15% | 5% | 0 | 1000 | |
| 2 | fuel | flights with 4 pm departure | 1000 gallons | 0 | January: +50 | 5% | 0 | 10% | 0 | 10000 | |
| 3 | bookings | all flights from Dallas to New York on Tuesday | 1500 | 10 | Quarter 2: +250 | 0% | 0% | 0% | 0 | 1000 | |

SYSTEM AND METHOD FOR ADAPTIVE FORECASTING

BACKGROUND

Forecasting is a tool often used to estimate and predict a particular need or demand. Accurate forecasts are capable of increasing revenues and reducing costs. It is generally preferable that mechanisms used to create forecasts be able to accurately forecast a wide array of variables, as well as being able to take into account additional factors.

SUMMARY OF THE INVENTION

The present invention is a method and system of using symbol-key pairings for adaptive forecasting of a wide array of variables. The symbol-key pairing allows a variable that is to be forecast to be paired with a particular level of detail for the forecast. A calibration engine may be used to generate model files based on symbol-key pairings. These model files can be stored on a database and retrieved as needed to generate a forecast. This method and system can generate forecasts from a wide array of variables, take into account additional factors, and increase the revenue and reduce the costs of companies and industries that rely on forecasting.

DETAILED DESCRIPTION

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Figure 1:
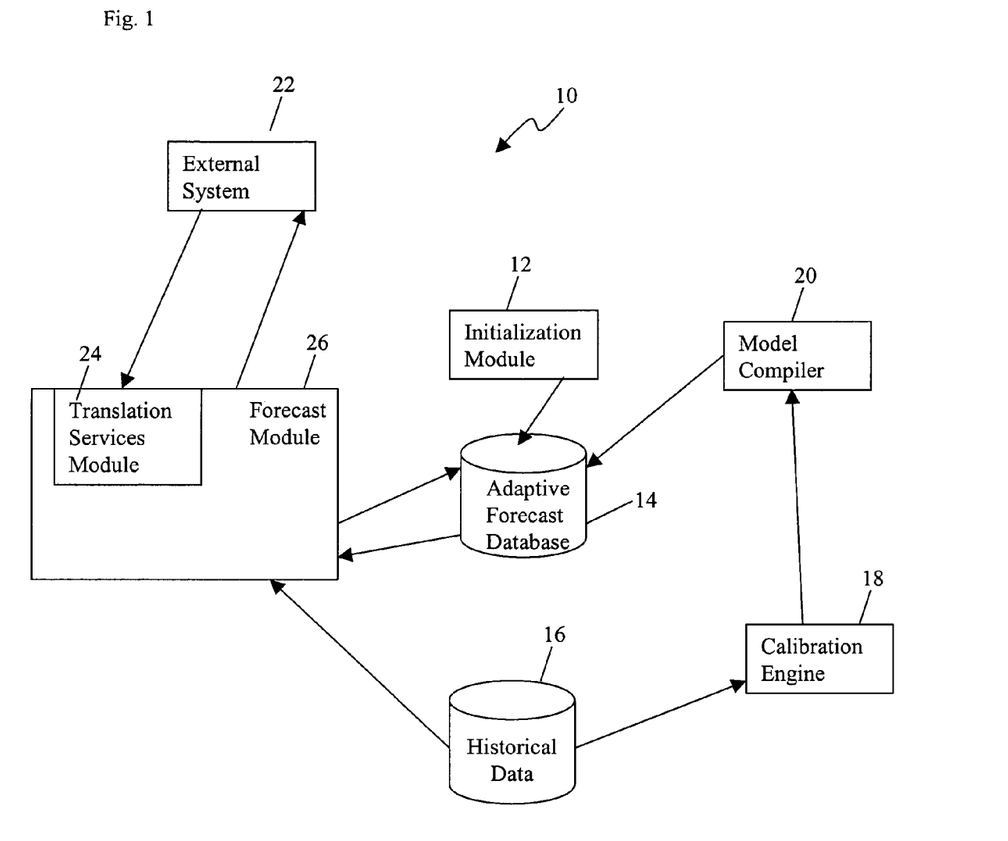
FIG. 1 is a diagram of an example embodiment of the present invention.

Referring now to FIG. 1, an embodiment 10 of a system and method for adaptive forecasting is shown. The system 10 uses symbol-key pairing for adaptive forecasting. A symbol is a variable that is being forecast. For example, the symbol could be the number of passengers, the number of bookings, the fuel used by a vehicle, miles traveled before repair needed, or any other variable that is capable of being forecast. A key is the level of detail of the symbol that is being forecast. For example, the detail could be "on a given flight," "in a given system," "in a particular market." Thus, a symbol-key pairing allows the variable that is to be forecast to be paired with a particular level of detail for the forecast. For example, a forecast for the number of passengers could be forecast on the level of the number of passengers on a passenger airline on all flights in the airline network departing at 8 a.m., the number of passengers on all flights departing from the Dallas-Fort Worth airport at 8 a.m., or the number of passengers on all flights in an airline's network.

The system 10 comprises an initialization module 12 that is in communication with an adaptive forecast database 14. The initialization module 12 establishes the calibration types and symbols available to the system 10, and may also correlate the calibration types and symbols stored in the adaptive forecast database 14 with identifiers, as described in more detail below.

A calibration type is one or more fields that can be associated with a particular key. For example, a calibration type could be "Flight." Another example could be "Flight and Time." In one embodiment, each calibration type has a calibration type identifier (an "ID"). A calibration type ID can be used to reference a particular calibration type. Using the prior examples, the calibration type "Flight" could be assigned calibration type identifier 3, and the calibration type "Flight and Time" could be assigned calibration type identifier 7.

In one embodiment, each calibration type is created to have a corresponding default calibration type. The default calibration type is another calibration type that can be used for defaulting. Defaulting occurs when a particular calibration type does not have sufficient (or any) data. As is explained in more detail below, when a calibration type is needed for a forecast, and there is insufficient historical data for the particular calibration type, the default calibration type can be used. An example default calibration type for a flight (e.g. the "Flight" calibration type) might be the market in which the flight occurs (e.g., a "Market" calibration type).

In another embodiment, each calibration type is created to have a corresponding parent calibration type. A parent calibration type is a calibration type that potentially shares a characteristic of the underlying calibration type, which may be referred to as a child calibration type. An example parent calibration type for a flight at a particular time (e.g. the "Flight and Time" calibration type) might be the flight (e.g. the "Flight" calibration type). In some embodiments, the default calibration type and the parent calibration type may be the same, while in other embodiments the parent calibration type and the default calibration type associated with the calibration type may be different.

The adaptive forecast database 14 contains calibration types and symbols available for forecast, and the components used in the forecasting models. In one embodiment, the adaptive forecast database 14 contains a table organized by symbol key ID and a calibration type ID, and a second table organized by symbol key ID, calibration type ID, and a season ID.

In another embodiment, the adaptive forecast database 14 may use Java Database Connectivity, and may also use the Java API for XML Processing (JAXP) for parsing XML input data. In a further embodiment, adaptive forecast database 14 is able to access distributed objects using J2EE, CORBA, or web services. In another embodiment, the adaptive database 14 is optimized for batch and transaction processing using index-organized tables. The indices that are dropped daily may be re-built online and in parallel, and tables that can be emptied or deleted on a periodic basis, such as daily, or may be truncated rather than deleted.

The historical database 16 contains the historical data for the environment. The environment is the system, network, or field in which the system 10 is used to create forecasts. In one embodiment, the environment is an airline network, and historical database 16 contains data about the airline network. In some embodiments, historical database 16 is the actual storage location for the historical data, while in other embodiments, historical database 16 obtains historical data from other data sources, including databases, flat files, or XML data used in the environment.

The calibration engine 18 communicates with historical database 16 to create the forecast model files. Model files are files that contain the values that can be used to generate a forecast. To create the forecast model files, calibration engine 18 analyzes the data in historical database 16. The calibration engine 18 uses the calibration type associated with a key to determine which historical data is applicable to the analysis. In one embodiment, the calibration engine 18 analyzes the data to determine a permanent component that represents the actual value associated with a particular symbol-key pairing. In an additional embodiment, the calibration engine 18 analyzes the data in historical database 16 to determine eight factors: a permanent component, a trend component, a seasonal component, a permanent smoothing constant, a trend smoothing constant, a seasonal smoothing constant, an outlier minimum, and an outlier maximum.

The permanent component is a historical value for a particular symbol-key pairing. The trend component is a value that represents the change occurring to the permanent component over time. The seasonal component is a value that represents a modification of the permanent component based on a particular time value.

The permanent smoothing constant is a value that can be used to update or modify the permanent component. Likewise, the trend smoothing constant and seasonal smoothing constant are values that can be used to modify the values with respect to the trend component and seasonal component, respectively.

The outlier minimum and outlier maximum are values that can provide minimum and maximum values for the actual forecast value, once it has been computed by the forecast module 26

After analyzing the data, the calibration engine 18 outputs a model file that contains a forecasting model for each symbol-key pair. The calibration engine 18 may run periodically to refresh the forecasting models. In one embodiment, the forecasting models are based on the Holt-Winters forecasting method. The calibration engine 18 may use statistics, econometrics, and matrix manipulation procedures to calibrate forecasting modules using the historical data.

The model compiler 20 receives the model files from the calibration engine 18 and converts the model files into components for storage in the adaptive forecast database 14. The conversion takes the model files received from the calibration engine 18 and correlates the information in the model files to the calibration type ID, symbol ID, calendar ID, and model components. The converted model files are then stored in the adaptive forecast database 14. In one embodiment, data scrubbing and analysis can also be performed on the data prior to loading into the adaptive forecasting database 14.

The external system 22 communicates with the forecast module 26 to request a forecast. External system 22 can be any application, database, entity, or system that could use or request a forecast. In one embodiment, the request contains three components. The first component is the desired aspect to be forecast (e.g. the symbol), such as bookings for an airplane. The second component is the level of detail in which the first component is to be forecast (e.g. the key). An example key could be "Flight 81." The third component would be a time value, such as month, day, year, calendar quarter, or another time value. For example, the third component could be Jun. 18, 2004 or the first quarter of 2005. In one embodiment, the forecast request would be communicated to a translation services module 24.

The translation services module 24 is capable of converting a forecast request received from an external system 22 into a format for use by the forecast module 26. The translation services module 24 is capable of identifying the correct forecasting model for the key. In one embodiment, the translation module sends the symbol ID, the calibration type ID, calendar ID and season ID to the forecast module 26.

The forecast module 26 communicates with the adaptive forecast database 14. The forecasting module extracts the model and data associated with a symbol-key pairing from the adaptive forecast database 14 and produces a forecast. In one embodiment, the forecast module 26 uses a symbol ID and a calibration type ID to retrieve the corresponding permanent component from the adaptive forecast database 14. In this embodiment, the forecast module 26 may return the permanent component as the forecast to the external system 22.

In another embodiment, the forecast module 26 uses a symbol ID and calibration type ID to retrieve the corresponding permanent and trend component from the adaptive forecast database 14, and a symbol ID, calibration ID, and season ID to retrieve the seasonal component from the adaptive forecast database 14. The forecast module 26 may insert the permanent component, trend component, and seasonal component into a forecasting formula. In one embodiment, the forecasting formula is:

$$\text{Forecast} = \text{Permanent Component} + \text{Trend Component} + \text{Seasonal Component}$$

The results of the forecasting formula are returned to the external system 22. While forecasts may be generated upon receipt of a request from an external system 22, forecasts may also be produced at a preset time using timer-activated events, such as running a forecast at midnight each day, or predetermined event triggers, such as running a forecast every third booking for a particular flight. In another embodiment, the processes that prepare keys for forecasting and for calculating forecasts are multi-threaded.

Figure 2:
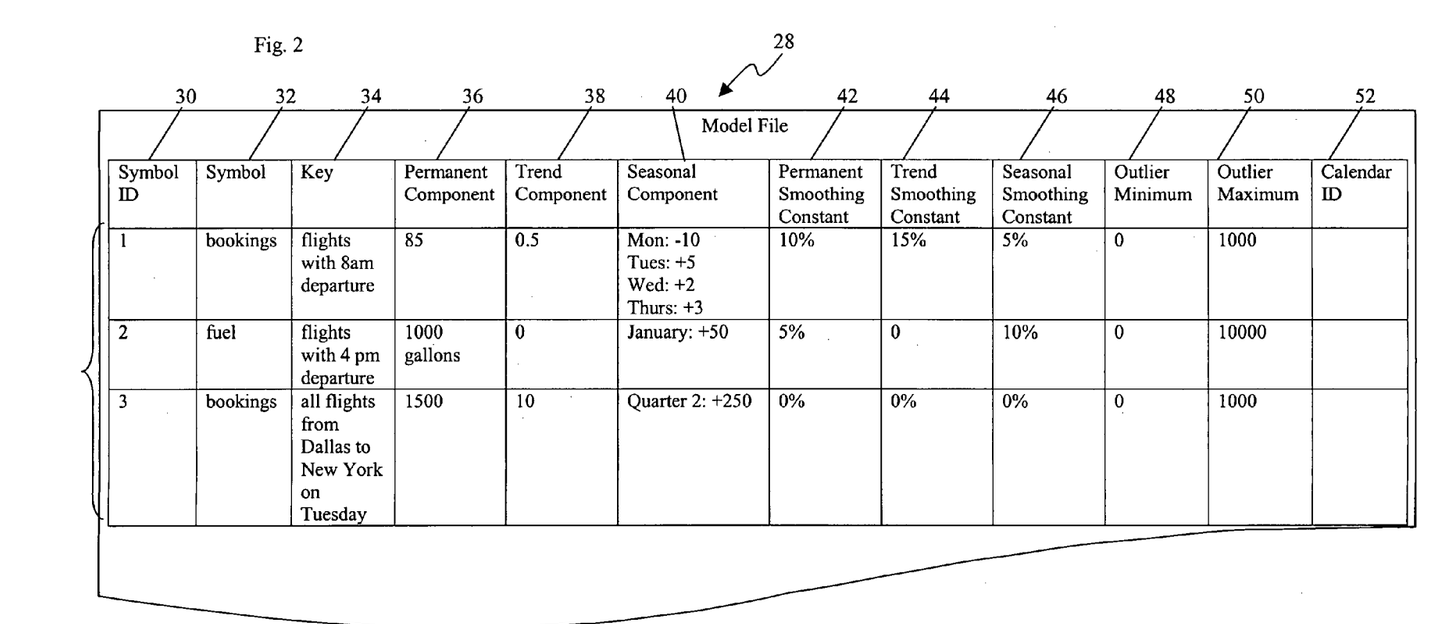
FIG. 2 is an example diagram depicting an embodiment of a model file.

Referring now to FIG. 2, an example model file 28 that could be output from the calibration engine 18 (FIG. 1) is shown. In model file 28, three models 54 are shown. Models 54 within the model file 28 may be distinguished using a symbol-key ID 30. Associated with each symbol-key ID 30 are a symbol 32, a key 34, a permanent component 36, a trend component 38, a seasonal component 40, a permanent smoothing constant 42, a trend smoothing constant 44, a seasonal smoothing constant 46, an outlier minimum 48, an outlier maximum 50, and a calendar ID 52. As discussed above, symbol 32 is the variable that could be forecast. The key 34 is the level of detail for the symbol 32. It is also contemplated that a particular symbol 32 could have different keys 34, an example of which is shown in FIG. 2 by symbol-key ID #1 and symbol-key ID #3, The permanent component 36 is the historical value for the symbol 32 and key 34 pairing. For example, the permanent component 36 for symbol-key ID #1 is 85, indicating that the historical value for the number of bookings on flights with an 8 am departure is 85. The trend component is the value that represents the change occurring to the corresponding permanent component 36 over time. For example, the trend component 38 for symbol-key ID #1 is 0.5, indicating that, over time, the number of bookings on flights with an 8 am departure is increasing by approximately 0.5 bookings. The seasonal component 40 is the value that represents a modification of the corresponding permanent component 36 based on a particular time value. For example, the seasonal component 40 for symbol-key ID #1 is "Monday: −10, Tuesday: +5, Wednesday: +2, Thursday: +3," indicating that on Mondays, the number of bookings on flights with an 8 am departure decrease by 10; on Tuesdays the number of bookings increase by 5; on Wednesdays, the number of bookings increase by 2; and on Thursdays, the bookings increase by 3.

The permanent smoothing constant 42 is a value that can be used to update or modify the corresponding permanent component 36. For example, the permanent smoothing constant 42 for symbol-key ID #1 is 10%, indicating that the permanent component 36 may need to be modified by 10%. Likewise, the trend smoothing constant 44 and seasonal smoothing constant 46 are values that can be used to modify the values with respect to the corresponding trend component 38 and corresponding seasonal component 40, respectively.

The outlier minimum 48 and outlier maximum 50 are values that provide minimum and maximum values for the actual forecast value, once it is computed by the forecast module 26 (FIG. 1). The calendar ID 52 is the time value for the calibration type associated with a key. In this example model file 28, the calendar IDs 52 for each model 54 have not been calculated.

The values stored in the model file for a particular forecast model can be used to modify and update the data. In one embodiment, the data may be updated each time the historical database 16 (FIG. 1) is modified. For example, the historical database 16 (FIG. 1) reflects that a particular flight had 75 passengers on Monday, 90 passengers on Tuesday, and 87 passengers on Wednesday, as shown below:

| Date | Number of Passengers | Day of Flight |
|---|---|---|
| Dec. 1, 2003 | 75 | Monday |
| Dec. 2, 2003 | 90 | Tuesday |
| Dec. 3, 2003 | 87 | Wednesday |

The historical data reflects an average of 84 passengers on the flight each day. The seasonal component can be determined by the difference of the actual number and the average. The following chart reflects the seasonal value attributable to the day of flight:

| Date | Number of Passengers | Day of Flight | Seasonal Value |
|---|---|---|---|
| Dec. 1, 2003 | 75 | Monday | −11 |
| Dec. 2, 2003 | 90 | Tuesday | +6 |
| Dec. 3, 2003 | 87 | Wednesday | +3 |

As data is modified in the historical database 14 (FIG. 1) the average is recalculated. For example, on Thursday, there are 88 passengers on the applicable flight, and the historical database is modified to reflect this new data. The historical data results in an average of 85 passengers per flight. Accordingly, the seasonal value components would be need to be modified accordingly.

| Date | Number of Passengers | Day of Flight | Seasonal Value |
|---|---|---|---|
| Dec. 1, 2003 | 75 | Monday | −10 |
| Dec. 2, 2003 | 90 | Tuesday | +5 |
| Dec. 3, 2003 | 87 | Wednesday | +2 |
| Dec. 4, 2003 | 88 | Thursday | +3 |

In another embodiment, each model is updated by using new actual values that update the permanent component, the seasonal component, and the trend component. In one embodiment, the components are updated using the following equations:

$$PCu = (100\% - PSC) * (TCc + PCc) + (PSC * (NewData - SCc))$$

$$TCu = (100\% - TSC) * TCc + (TSC * (PCu - PCc))$$

$$SCu = (100\% - SSC) * (SCc) + (SSC * (NewData - PCu))$$

where
  PCu is the updated permanent component
  PSC is the permanent smoothing coefficient
  PCc is the current permanent component
  TCu is the updated trend component
  TSC is the trend smoothing coefficient
  TCc is the current trend component
  SCu is the updated seasonal component
  SSC is the seasonal smoothing coefficient
  SCc is the current seasonal component
  NewData is the new actual data For example, using the historical data from the previous example, and the remaining components from model file 28 and symbol-key pairing for symbol ID#1, the permanent component is 85. Additionally, the current trend component is 0.5, and the current seasonal component is +3, the permanent smoothing component is 10%, the trend smoothing component is 15%, and the seasonal smoothing component is 5%. Using the equations above, and the example values for the symbol-key pairing for symbol ID#1:

$$\begin{aligned}
PCu &= (100\% - 10\%) * (0.5 + 85) + (10\% * (88 - 3)) \\
&= 90\% * 85.5 + 10\% * 85 \\
&= 76.95 + 8.5 \\
&= 85.45 \\
TCu &= (100\% - 15\%) * 0.5 + (15\% * (85.45 - 85)) \\
&= 85\% * 0.5 + 15\% * 0.45 \\
&= 0.425 + 0.0675 \\
&= 0.4925 \\
SCu &= (100\% - 5\%) * 3 + (5\% * (88 - 85.45)) \\
&= 95\% * 3 + 20\% * 2.55 \\
&= 2.85 + 0.51 \\
&= 3.36
\end{aligned}$$

In one embodiment, the outlier minimum and outlier maximum values can be used as part of the equation to reduce the error between the forecasts and the actual values.

Figure 3:
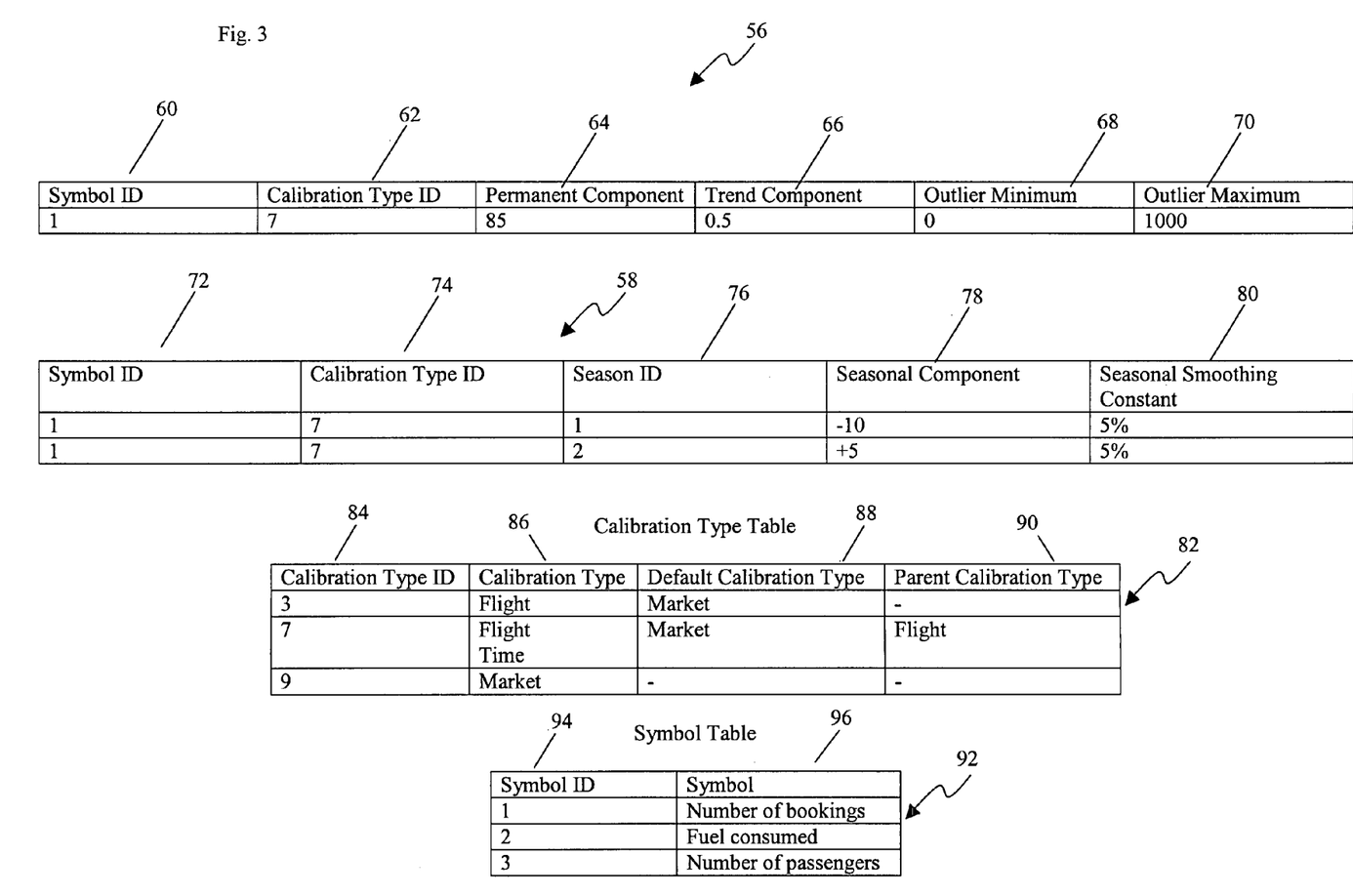
FIG. 3 is an example diagram depicting example tables for use in embodiment of the present invention.

Referring now to FIG. 3, an example table 56 and an example table 76 are shown for storing the model components in an adaptive forecast database. An example table 52 is shown for storing available calibration types, and an example table 90 is shown for storing those symbols available for forecasting. Table 56 comprises a symbol ID 60, and associated with each symbol ID 60 is a calibration type ID 62, a permanent component 64, a trend component 66, an outlier minimum 68, and an outlier maximum 70. Table 58 comprises a symbol ID 72, and associated with each symbol ID 72 is a calibration type ID 74, season ID 76, a seasonal component 78 and a seasonal smoothing constant 80.

Table 82 comprises a calibration type ID 84, and associated with calibration type ID 84 is a calibration type 86, a default calibration type 88, and a parent calibration type 90. In this example, there are three calibration type IDs: calibration type ID 3, which correlates with the "Flight" calibration type and has a default calibration type of "Market;" calibration type ID 7, which correlates with the "Flight and Time" calibration type, and has a default calibration type of "Market" and a parent calibration type of "Flight;" and calibration type ID 9, which correlates to the "Market" calibration type.

Table 92 comprises a symbol ID 94, and associated with each symbol ID 94 is a symbol 96. In this example, there are three symbol IDs: symbol ID 1, which correlates to the "number of bookings" symbol; symbol ID 2, which correlates to the "fuel consumed" symbol; and symbol 3, which correlates to the "number of passengers" symbol.

Figure 4:
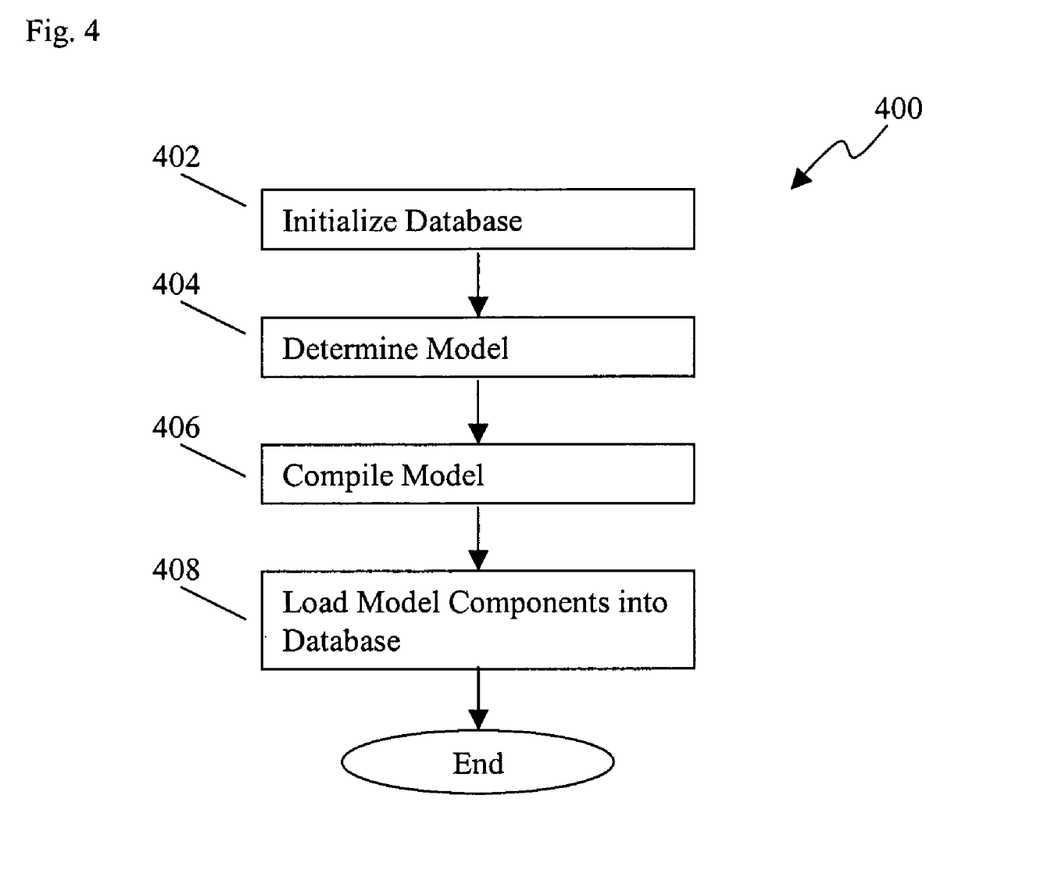
FIG. 4 depicts the operational flow for initializing an embodiment of the present invention.

Referring now to FIG. 4, a method 400 of initializing the adaptive forecast database is shown. At step 402, the initialization module initializes the adaptive forecast database. The initialization module tells the database what calibration types may be forecasted and what symbols can be forecasted. The initialization module can also establish the default calibration types and parent calibration types.

At step 404, the calibration engine determines the forecasting model. In one embodiment, the calibration engine determines the forecasting model values by examining the historical data in accordance with the Holt-Winters forecasting method. In another embodiment, the calibration engine determines eight factors: a permanent component, a trend component, a seasonal component, a permanent smoothing constant, a trend smoothing constant, a seasonal smoothing constant, an outlier minimum, and an outlier maximum.

At step 406, the forecasting model determined by the calibration engine is compiled. Compilation of the forecasting model converts the forecasting model into the symbol ID, calibration type ID, permanent component, trend component, outlier minimum, outlier maximum, seasonal ID, seasonal component, and seasonal smoothing constant values. At step 408, the model components are stored in the adaptive forecast database. In one embodiment, the components can be stored in two database tables.

Figure 5:
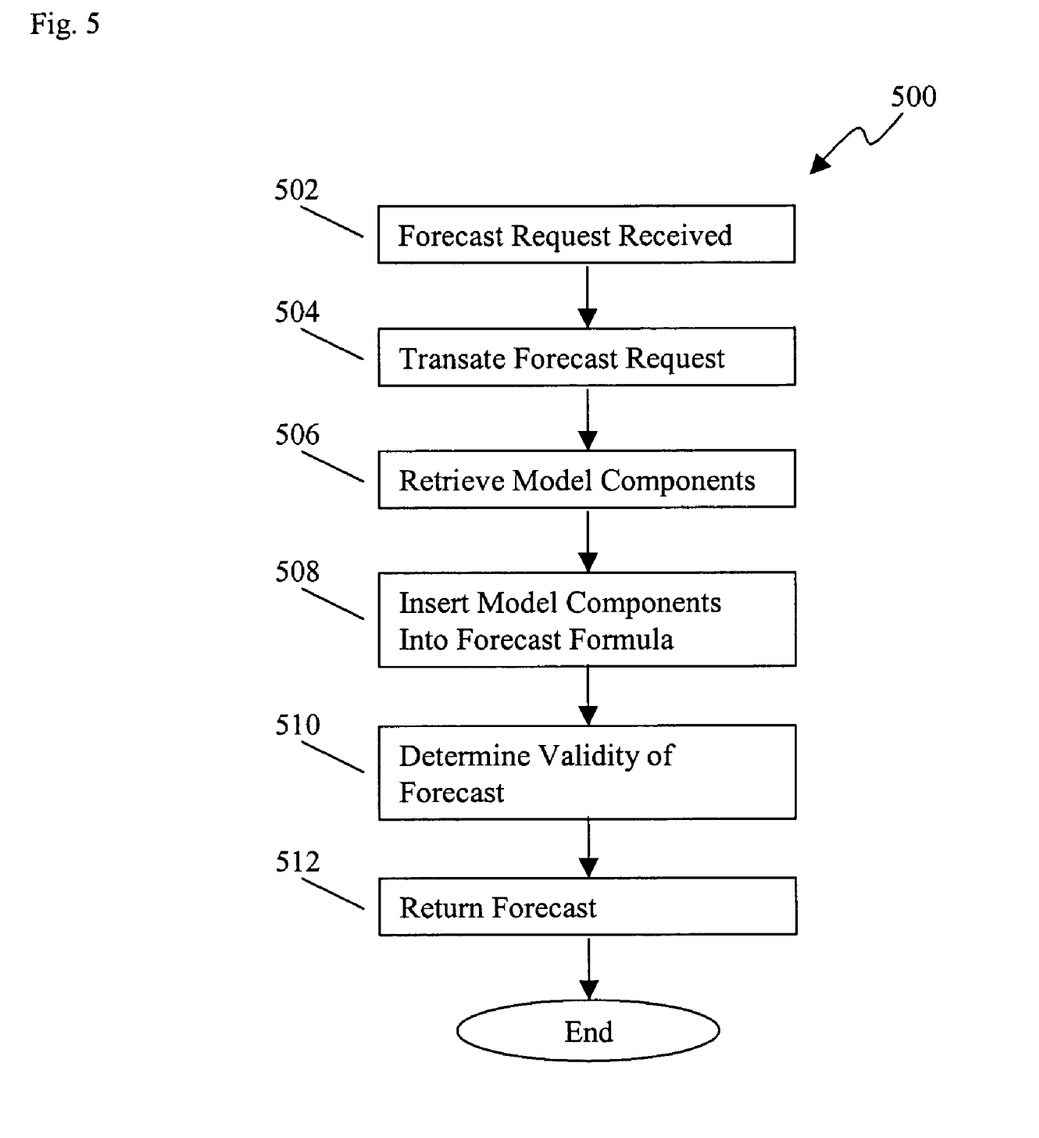
FIG. 5 depicts the operational flow for an embodiment of the present invention.
Figure 6:
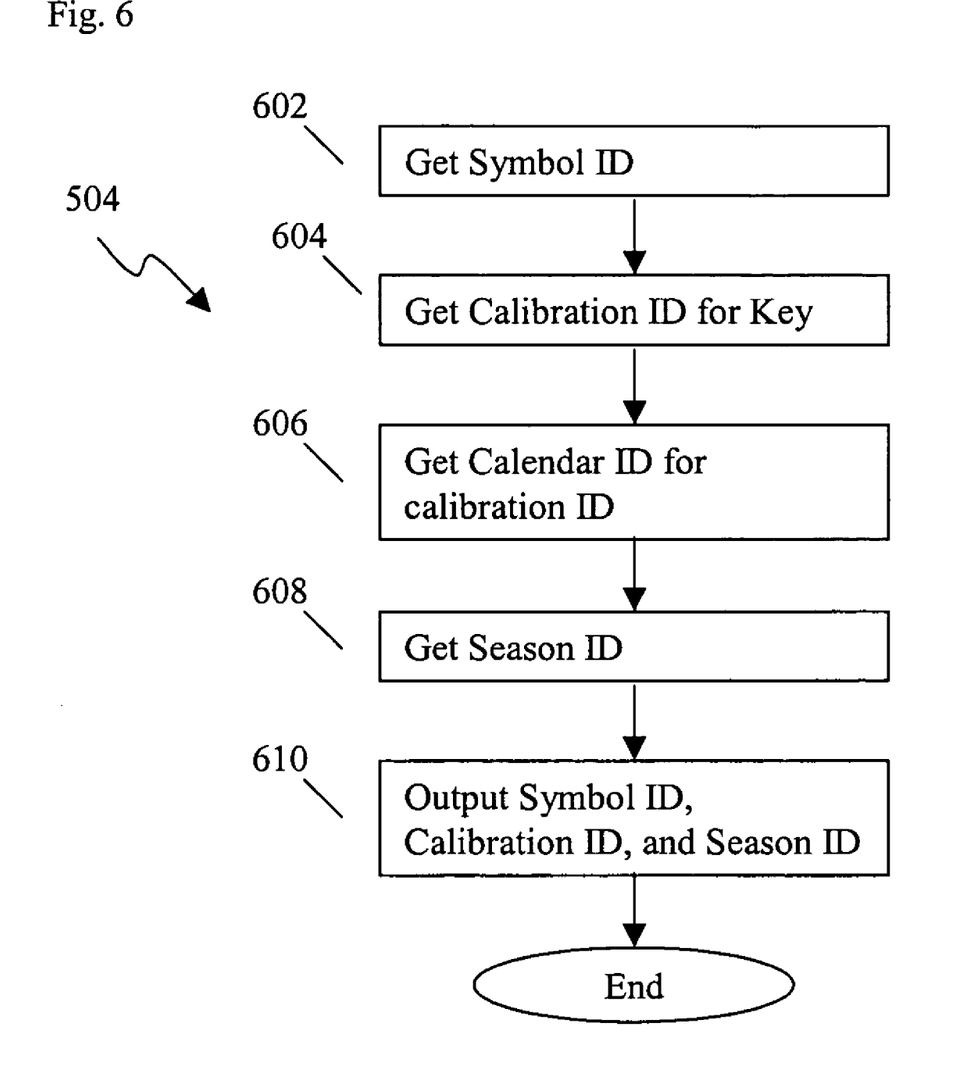
FIG. 6 depicts the operational flow for translating a forecast request in an embodiment of the present invention.

Referring now to FIG. 5, a method 500 of forecasting is shown. At step 502, a forecast request may be received. In one embodiment, the request is in an extensible markup language format and contains a symbol, key, and time value. In another embodiment, the request for a forecast is received from an external system. At step 504, the request for a forecast is translated into symbol ID, calibration type ID, and seasonal ID. An example embodiment for translating the request is shown in FIG. 6.

At step 506, the model components are retrieved from the adaptive forecasting database using the symbol ID, calibration type ID, and seasonal ID. At step 508, the model components are inserted into the forecasting formula and the forecast is calculated using the forecasting formula.

At step 510, the results of the forecasting formula are checked for validity. In one embodiment, the forecast can be compared against the outlier minimum and outlier maximum values.

In another embodiment, the results may be reconciled based on multiple levels of forecasts. This reconciliation may be performed using parent and child calibration types. For example, the forecast for the number of passengers in the market of flights from Dallas to New York results in a forecast of 1000 passengers. This forecast was calculated on the basis of the calibration type "Market." However, if the forecast was calculated using the child calibration type of "Market," which in this example, is "Flight", the total of the forecasts for the flights in the Dallas to New York market is a forecast of 900 passengers. In this reconciliation embodiment, the ratio between the broader forecast (e.g. the forecast for the Market) and the summation of the narrower forecasts (e.g. the forecasts for the individual Flights) is calculated. In this example, the ratio is 1000/900 or 10/9. Accordingly, in this embodiment, the forecasts for each flight may altered using the calculated ratio. In one embodiment, the ratio is used by multiplying the ratio against the forecast. For example, if a flight from Dallas to New York is forecasted to have 90 passengers, the post-processing will result in a forecast of 100 (e.g. 90*10/9). In other embodiments, the ratio may be used in other manners to modify the forecast to reconcile with the parent forecast.

At step 512, the results of the forecasting formula are returned to the forecast requestor. In another embodiment, alerts can be generated and returned to the forecast requestor when a forecast does not meet expected criteria based on hierarchical statistical quality control charts. For example, an alert can be generated if a forecast for a particular airplane flight fails statistical tests, such as generating a forecast outside of the outlier minimum or outlier maximum values. In another example, an alert can be generated if enough forecasts for a calibration type under a particular parent calibration type fail statistical tests. Statistical tests can be any form of statistical analysis to determine if data is outside expected parameters. For example, if two of the last three forecasts had errors outside two standard deviations, the forecast model may have fallen outside the expected parameters. Of course, other thresholds and statistical aspects could be used for the tests.

Referring now to FIG. 6, an example method 604 for translating a forecast request into model and data objects is shown. For example purposes, an external system has requested a forecast of the number of bookings on Flight 81 for the week of Jun. 18, 2004. At step 602, the symbol ID for the symbol component is retrieved. In this example, the symbol ID for "number of bookings" is 1. At step 604, the calibration type ID for the key component of the forecast request is retrieved from the adaptive forecast database. In this example, since the forecast request was for a particular flight (i.e. "Flight 81"), the calibration type is "Flight." The calibration type ID for the calibration type "Flight" is 3.

At step 606, the calendar ID for the time value component of the forecast is determined. The calendar ID is a cross-reference to a particular time value, and these cross-references are predetermined. In one embodiment, a calendar ID of 1 indicates "day," calendar ID 2 indicates "week," and calendar ID 3 indicates "month." In another embodiment, the calendar ID may be supplied by a third party system, such as the Airmax™ system provided by Sabre, Inc. In this example, the forecast was for "the week of," which results in a calendar ID of 2.

At step 608, the calendar ID and the time component of the forecast request are used to determine the season value. Thus, a single time component could result in different season values, based on the associated calendar ID. In one embodiment, there are predetermined season values. For example, a time value of Jun. 18, 2004 could result in a season value of Friday (if the calendar ID is 1), $25^{th}$ week of the year (if the calendar ID is 2), or June (if the calendar ID is 3). In this example, the time value was "Jun. 18, 2004" and the calendar ID was 2, resulting in a season value of "$25^{th}$ week of the year." In one embodiment, the season value may also have a corresponding season value identifier (or ID). In another embodiment, the season value and/or season ID may be supplied by a third party system, such as the Airmax™ system provided by Sabre, Inc. At step 610, the symbol ID, calibration type ID, and season ID are output to the forecast module.

Figure 7:
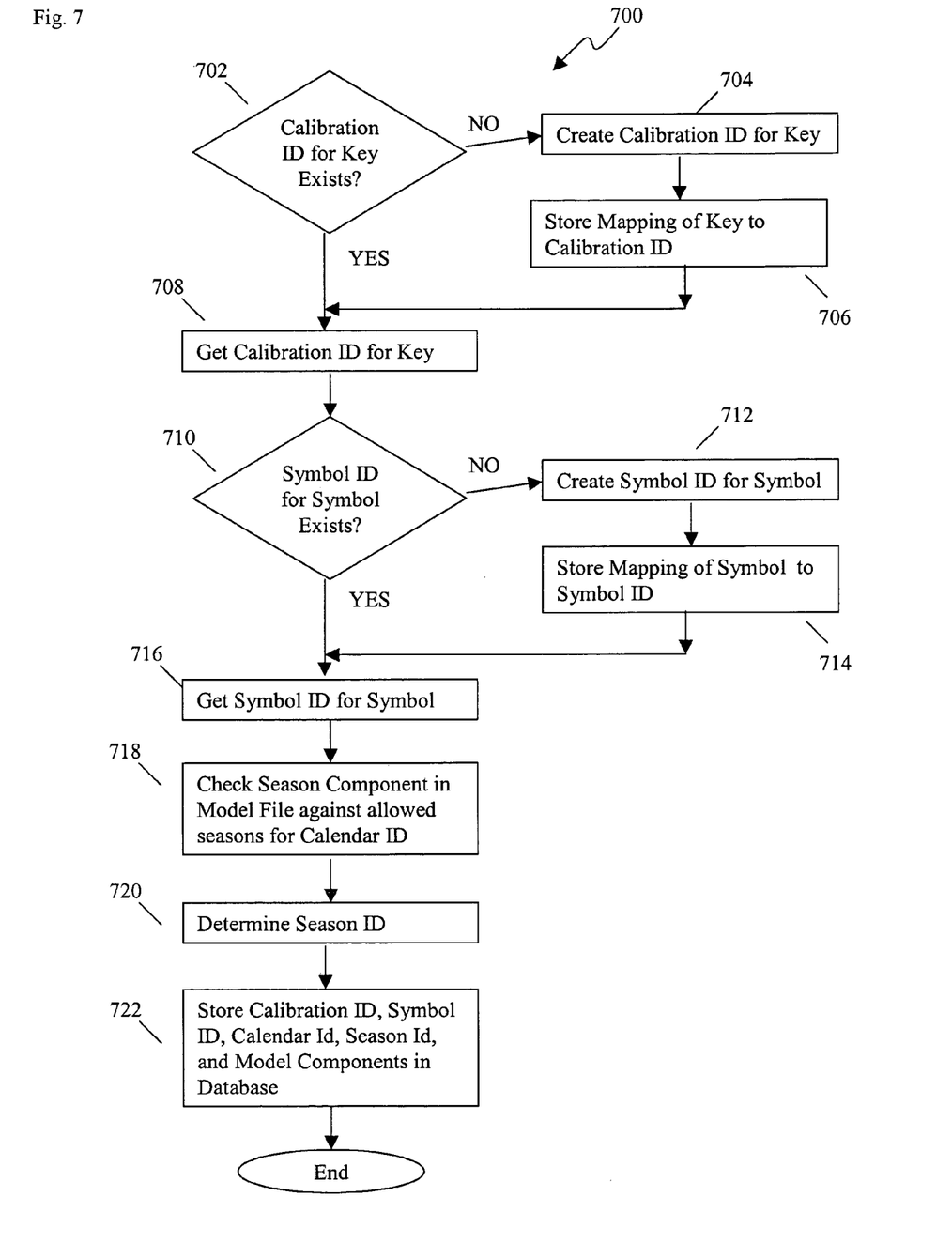
FIG. 7 depicts the operational flow for loading a model file into a database in an embodiment of the present invention.

Referring now to FIG. 7, a method 700 of loading a model into the adaptive forecast database is shown. At step 702, the system checks to see if a calibration type ID exists for the key. If there is no calibration type ID for the key, then the process proceeds to step 704. If there is a calibration type ID for the key, then the process proceeds to step 708.

Figure 8:
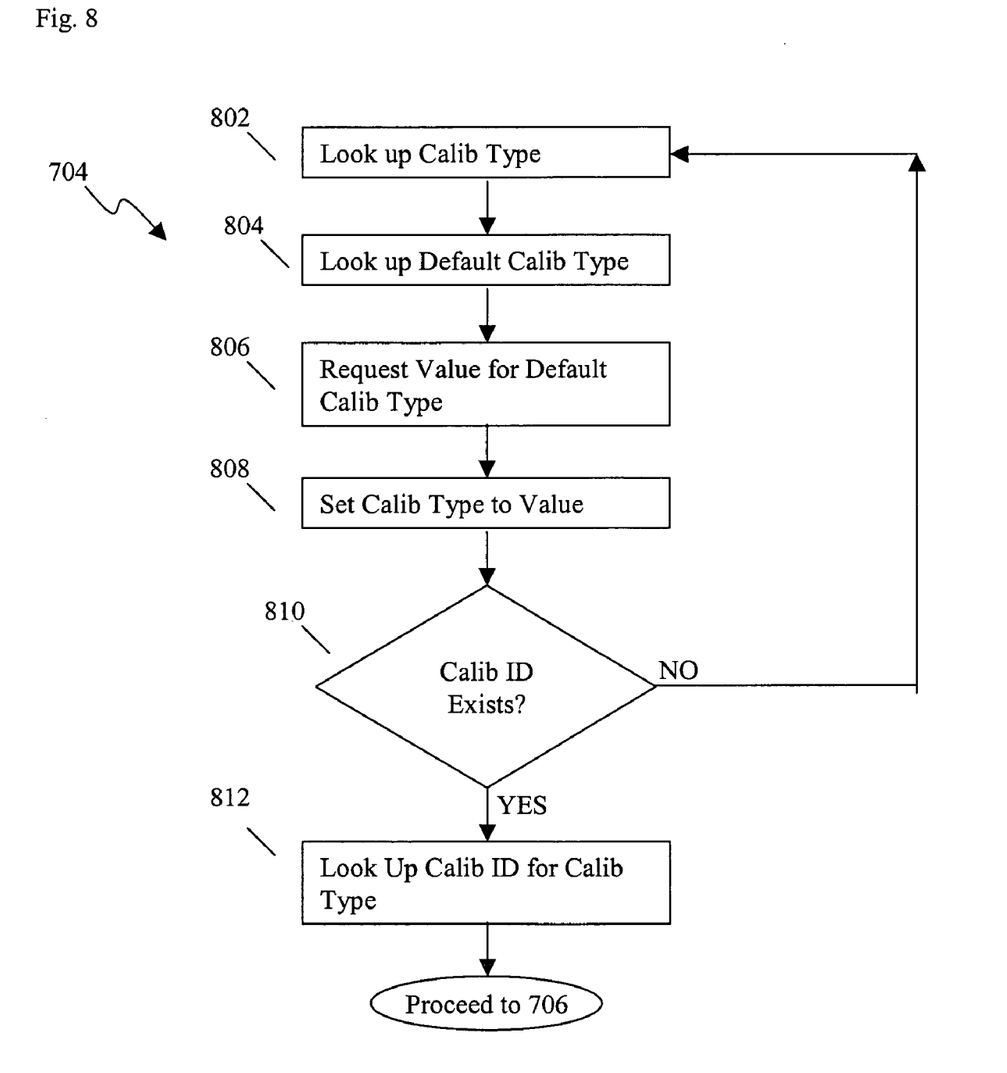
FIG. 8 depicts the operational flow for generating a calibration ID in an embodiment of the present invention.

At step 704, the system creates a calibration type for the key. In one embodiment, the calibration type is created by analyzing the historical data associated with the key. In another embodiment, the calibration type may be created by comparing other calibration types with the historical data associated with the key. A further embodiment for creating a calibration type is shown in FIG. 8. At step 706, the system stores a mapping of the key to the calibration type. The system may also assign a new calibration type ID to the new calibration type.

At step 708, the system retrieves the calibration type for the key. At step 710, the system checks to see if a symbol ID exists for the symbol. If there is no symbol ID for the symbol, then the process proceeds to step 712. If there is a symbol ID for the symbol, then the process proceeds to step 716.

At step 712, the system creates a symbol ID for the symbol. At step 714, the system stores a mapping of the symbol to the symbol ID.

At step 716, the system retrieves the symbol ID for the symbol. At step 718, the system retrieves the calendar ID based on the seasonal component in the model file. For example, if the seasonal component is based on "days," then the calendar ID would be 1. At step 720, determine the season value. In one embodiment, the season ID that corresponds to the season value may also be determined. At step 722, the calibration type ID, symbol key ID, calendar ID, season ID and model components are stored in the adaptive forecast database.

Referring now to FIG. 8, an example embodiment 704 for creating a calibration type is shown. For example purposes, the requesting system had requested a forecast for a flight departing at 10 am from Dallas and traveling to New York, and no calibration type has been assigned for this flight. At step 802, the calibration type is determined. In the example, the calibration type for a flight departing at 10 am would be "Flight and Time." At step 804, the default calibration type for the calibration type is retrieved. For this example, it has been determined that the calibration type for "Flight and Time" has a default calibration type of "Market."

At step 806, the value for the default calibration type is retrieved from the system requesting the forecast. Since the default calibration type in the example is "Market," the value for the Market is requested. In this example, the requesting system indicates that the Market associated with the flight departing at 10 am from Dallas and traveling to New York is "Dallas to New York."

At step 808, the calibration type is set to the calibration type value received from the requesting system. In this example, the calibration type of "Market" is set to a value of "Dallas to New York." At step 810, the method determines whether sufficient historical data for the calibration type exists. If not, the method returns to step 804 to determine the default calibration type for the current calibration type.

At step 812, a calibration type ID is assigned to the calibration type.

Figure 9:
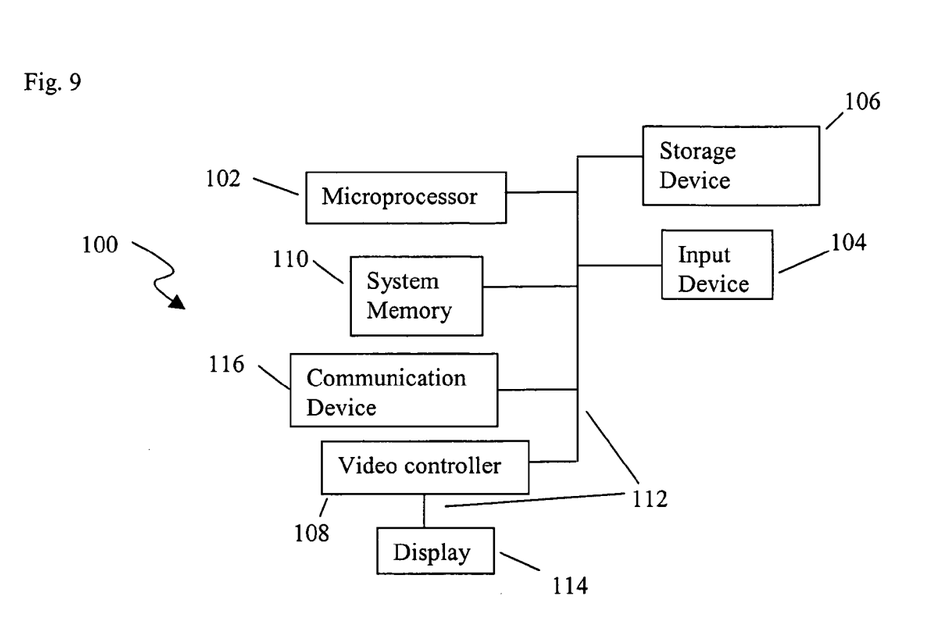
FIG. 9 is a diagram of an example node for implementing an embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 9, an illustrative node 100 for implementing an embodiment of the method is depicted. Node 100 includes a microprocessor 102, an input device 104, a storage device 106, a video controller 108, a system memory 110, and a display 114, and a communication device 116 all interconnected by one or more buses 112. The storage device 106 could be a floppy drive, hard drive, CD-ROM, optical drive, or any other form of storage device. In addition, the storage device 106 may be capable of receiving a floppy disk, CD-ROM, DVD-ROM, or any other form of computer-readable medium that may contain computer-executable instructions. Further communication device 116 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

In one embodiment, a method for adaptive forecasting, comprises generating a model file containing at least one forecast model, determining a calibration type that corresponds to a symbol and a key in the at least one forecast model, storing the model file in a database, receiving a request for a forecast based on the symbol and the key, retrieving the model file from the database, and calculating a forecast using the at least one forecast model.

In another embodiment, a method for adaptive forecasting, comprises receiving a symbol and key, determining a calibration type for the key, retrieving a permanent component value associated with the calibration type and the symbol, and determining a forecast value using the permanent component value.

In a further embodiment, a system for adaptive forecasting, comprises a database of historical data for a travel network, a model generator module for generating a model from the historical data, an adaptive forecast database for storing the generated model, and a forecast module in communication with the adaptive forecast database.

In yet another embodiment, a computer-readable medium comprises a series of instructions for execution by at least one computer processor, wherein the instructions generate a plurality of forecast models, determine a calibration type that corresponds to a symbol and a key in one of the plurality of forecast models, create a model file containing the plurality of forecast models, wherein the symbol and key represent one of the plurality of forecast models, store the model file in a database, receive a request for a forecast based on the symbol and the key, retrieve the one of the plurality of forecast models that is associated with the symbol and key from the database, and calculate a forecast using the retrieved forecast model.

In another embodiment, a system for adaptive forecasting, comprises a means for generating a model file containing at least one forecast model, a means for determining a calibration type that corresponds to a symbol and a key in the at least one model, a means for storing the model file in a database, a means for receiving a request for a forecast based on the symbol and the key, a means for retrieving the model file from the database, and a means for calculating a forecast using the at least one forecast model.

While the examples and naming conventions used herein have been related to air travel, it is understood that the system and method for adaptive forecasting could be used in any form of travel or logistics industry, including the rail industry, cruise industry, shipping industry, and bus travel. The foregoing has outlined features of several embodiments so that those skilled in the art may better understand the detailed description that follows. In embodiments where an ID is used, it is understood that the ID could be replaced with the value it is identifying. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for adaptive forecasting, comprising:
    receiving a request to forecast a number of tickets that will be sold for a future airline flight, wherein the future airline flight will depart:
        from a departure market,
        at a departure time,
        on a day of the week, and
        in a month in a quarter;
    retrieving a first permanent component, the first permanent component being a historical average number of tickets that were sold over a first time period for past airline flights that have departed from the departure market at the departure time;
    retrieving a first trend component, the first trend component being based on a first trend difference between the first permanent component and a first previous permanent component,
        the first previous permanent component being a historical average number of tickets that were sold over a second time period for past airline flights that have departed from the departure market at the departure time,
        wherein the end of the second time period occurred before the end of the first time period,
        wherein the first trend difference is positive if the first permanent component is greater than the first previous permanent component, and
        wherein the first trend difference is negative if the first permanent component is less than the first previous permanent component;
    retrieving a first seasonal component,
        the first seasonal component being based on a first seasonal difference between the first permanent component and a historical average number of tickets that were sold over the first time period for past airline flights that have departed from the departure market at the departure time, and that have departed on the day of the week, in the month, or in the quarter, wherein the first seasonal difference is negative if the first permanent component is greater than the historical average number of tickets that were sold over the first time period for past airline flights that have departed from the departure market at the departure time, and that have departed on the day of the week, in the month, or in the quarter, and wherein the first seasonal difference is positive if the first permanent component is less than the historical average number of tickets that were sold over the first time period for past airline flights that have departed from the departure market at the departure time, and that have departed on the day of the week, in the month, or in the quarter;

determining, using a computer, a first forecast of the number of tickets that will be sold for the future airline flight, the first forecast being based on the first permanent component, the first trend component, and the first seasonal component;

determining whether the first forecast is valid; and if the first forecast is not valid, then:

retrieving a second permanent component, the second permanent component being a historical average number of tickets that were sold over the first time period for past airline flights that have departed from the departure market at either the departure time or one or more other departure times;

retrieving a second trend component, the second trend component being based on a second trend difference between the second permanent component and a second previous permanent component, the second previous permanent component being a historical average number of tickets that were sold over the second time period for past airline flights that have departed from the departure market at either the departure time or the one or more other departure times, wherein the second trend difference is positive if the second permanent component is greater than the second previous permanent component, and wherein the second trend difference is negative if the second permanent component is less than the second previous permanent component;

retrieving a second seasonal component, the second seasonal component being based on a second seasonal difference between the second permanent component and a historical average number of tickets that were sold over the first time period for past airline flights that have departed from the departure market at either the departure time or the one or more other departure times, and that have departed on the day of the week, in the month, or in the quarter;

wherein the second seasonal difference is negative if the second permanent component is greater than the historical average number of tickets that were sold over the first time period for past airline flights that have departed from the departure market at either the departure time or the one or more other departure times, and that have departed on the day of the week, in the month, or in the quarter, and wherein the second seasonal difference is positive if the second permanent component is less than the historical average number of tickets that were sold over the first time period for past airline flights that have departed from the departure market at either the departure time or the one or more other departure times, and that have departed on the day of the week, in the month, or in the quarter; and determining, using a computer, a second forecast of the number of tickets that will be sold for the future airline flight, the second forecast being based on the second permanent component, the second trend component, and the second seasonal component.

2. The method of claim 1, further comprising:
if the first forecast is not valid, then returning the second forecast in response to the request to forecast the number of tickets that will be sold for the future airline flight.

3. The method of claim 1, further comprising:
if the first forecast is not valid, then:
determining whether the second forecast is valid; and
if the second forecast is valid, then returning the second forecast in response to the request to forecast the number of tickets that will be sold for the future airline flight.

4. The method of claim 1, further comprising:
if the first forecast is valid, then returning the first forecast in response to the request to forecast the number of tickets that will be sold for the future airline flight.

5. The method of claim 1, further comprising:
if the first forecast is valid, then:
determining a third forecast, wherein the third forecast is the product of the first forecast multiplied by a ratio; and
returning the third forecast in response to the request to forecast the number of tickets that will be sold for the future airline flight.

6. The method of claim 5, wherein determining the third forecast comprises:
retrieving a third permanent component, the third permanent component being a historical average number of tickets that were sold over the first time period for past airline flights that have departed from either the departure market or one or more other markets at either the departure time or the one or more other departure times;

retrieving a third trend component, the third trend component being based on a third trend difference between the third permanent component and a third previous permanent component, the third previous permanent component being a historical average number of tickets that were sold over the second time period for past airline flights that have departed from either the departure market or the one or more other markets at either the departure time or the one or more other departure times, wherein the third trend difference is positive if the third permanent component is greater than the third previous permanent component, and wherein the third trend difference is negative if the third permanent component is less than the third previous permanent component;

retrieving a third seasonal component, the third seasonal component being based on a third seasonal difference between the third permanent component and a historical average number of tickets that were sold over the first time period for past airline flights that have departed from either the departure market or the one or more other markets at either the departure time or the one or more other departure times, and that have departed on the day of the week, in the month, or in the quarter, and wherein the third seasonal difference is negative if the third permanent component is greater than the historical average number of tickets that were sold over the first time period for past airline flights that have departed from either the departure market or the one or more other markets at either the departure time or the one or more other departure times, and that have departed on the day of the week, in the month, or in the quarter, and wherein the third seasonal difference is positive if the third permanent component is less than the historical average number of tickets that were sold over the first time period for past airline flights that have departed from either the departure market or the one or more other markets at either the departure time or the one or more other departure times, and that have departed on the day of the week, in the month, or in the quarter;

determining, using a computer, a fourth forecast of the number of tickets that will be sold for the future airline flight, the third forecast being based on the third permanent component, the third trend component, and the third seasonal component; and determining, using a computer, the ratio, wherein the ratio equals the quotient of the first forecast divided by the fourth forecast.

7. A computer readable medium that is non-transitory, the computer readable medium comprising a plurality of instructions for execution by at least one computer processor, the plurality of instructions comprising:

instructions for receiving a request to forecast a number of tickets that will be sold for a future airline flight, wherein the future airline flight will depart:
from a departure market,
at a departure time,
on a day of the week, and
in a month in a quarter;

instructions for retrieving a first permanent component, the first permanent component being a historical average number of tickets that were sold over a first time period for past airline flights that have departed from the departure market at the departure time;

instructions for retrieving a first trend component, the first trend component being based on a first trend difference between the first permanent component and a first previous permanent component,
the first previous permanent component being a historical average number of tickets that were sold over a second time period for past airline flights that have departed from the departure market at the departure time,
wherein the end of the second time period occurred before the end of the first time period,
wherein the first trend difference is positive if the first permanent component is greater than the first previous permanent component, and
wherein the first trend difference is negative if the first permanent component is less than the first previous permanent component;

instructions for retrieving a first seasonal component,
the first seasonal component being based on a first seasonal difference between the first permanent component and a historical average number of tickets that were sold over the first time period for past airline flights that have departed from the departure market at the departure time, and that have departed on the day of the week, in the month, or in the quarter, wherein the first seasonal difference is negative if the first permanent component is greater than the historical average number of tickets that were sold over the first time period for past airline flights that have departed from the departure market at the departure time, and that have departed on the day of the week, in the month, or in the quarter, and wherein the first seasonal difference is positive if the first permanent component is less than the historical average number of tickets that were sold over the first time period for past airline flights that have departed from the departure market at the departure time, and that have departed on the day of the week, in the month, or in the quarter;

instructions for determining a first forecast of the number of tickets that will be sold for the future airline flight, the first forecast being based on the first permanent component, the first trend component, and the first seasonal component;

instructions for determining whether the first forecast is valid; and instructions for if the first forecast is not valid, then:
retrieving a second permanent component, the second permanent component being a historical average number of tickets that were sold over the first time period for past airline flights that have departed from the departure market at either the departure time or one or more other departure times;

retrieving a second trend component, the second trend component being based on a second trend difference between the second permanent component and a second previous permanent component,
the second previous permanent component being a historical average number of tickets that were sold over the second time period for past airline flights that have departed from the departure market at either the departure time or the one or more other departure times,
wherein the second trend difference is positive if the second permanent component is greater than the second previous permanent component, and
wherein the second trend difference is negative if the second permanent component is less than the second previous permanent component;

retrieving a second seasonal component,
the second seasonal component being based on a second seasonal difference between the second permanent component and a historical average number of tickets that were sold over the first time period for past airline flights that have departed from the departure market at either the departure time or the one or more other departure times, and that have departed on the day of the week, in the month, or in the quarter;

wherein the second seasonal difference is negative if the second permanent component is greater than the historical average number of tickets that were sold over the first time period for past airline flights that have departed from the departure market at either the departure time or the one or more other departure times, and that have departed on the day of the week, in the month, or in the quarter, and wherein the second seasonal difference is positive if the second permanent component is less than the historical average number of tickets that were sold over the first time period for past airline flights that have departed from the departure market at either the departure time or the one or more other departure times, and that have departed on the day of the week, in the month, or in the quarter; and determining, using a computer, a second forecast of the number of tickets that will be sold for the future airline flight, the second forecast being based on the second permanent component, the second trend component, and the second seasonal component.

8. The computer readable medium of claim 7, wherein the plurality of instructions further comprises:

instructions for if the first forecast is not valid, then returning the second forecast in response to the request to forecast the number of tickets that will be sold for the future airline flight.

9. The computer readable medium of claim 7, wherein the plurality of instructions further comprises:

instructions for if the first forecast is not valid, then:
determining whether the second forecast is valid; and
if the second forecast is valid, then returning the second forecast in response to the request to forecast the number of tickets that will be sold for the future airline flight.

10. The computer readable medium of claim 7, wherein the plurality of instructions further comprises:

instructions for if the first forecast is valid, then returning the first forecast in response to the request to forecast the number of tickets that will be sold for the future airline flight.

11. The computer readable medium of claim 7, wherein the plurality of instructions further comprises:

instructions for if the first forecast is valid, then:
determining a third forecast, wherein the third forecast is the product of the first forecast multiplied by a ratio; and
returning the third forecast in response to the request to forecast the number of tickets that will be sold for the future airline flight.

12. The computer readable medium of claim 11, wherein instructions for determining the third forecast comprise:

instructions for retrieving a third permanent component, the third permanent component being a historical average number of tickets that were sold over the first time period for past airline flights that have departed from either the departure market or one or more other markets at either the departure time or the one or more other departure times;

instructions for retrieving a third trend component, the third trend component being based on a third trend difference between the third permanent component and a third previous permanent component, the third previous permanent component being a historical average number of tickets that were sold over the second time period for past airline flights that have departed from either the departure market or the one or more other markets at either the departure time or the one or more other departure times, wherein the third trend difference is positive if the third permanent component is greater than the third previous permanent component, and wherein the third trend difference is negative if the third permanent component is less than the third previous permanent component;

instructions for retrieving a third seasonal component, the third seasonal component being based on a third seasonal difference between the third permanent component and a historical average number of tickets that were sold over the first time period for past airline flights that have departed from either the departure market or the one or more other markets at either the departure time or the one or more other departure times, and that have departed on the day of the week, in the month, or in the quarter, and wherein the third seasonal difference is negative if the third permanent component is greater than the historical average number of tickets that were sold over the first time period for past airline flights that have departed from either the departure market or the one or more other markets at either the departure time or the one or more other departure times, and that have departed on the day of the week, in the month, or in the quarter, and wherein the third seasonal difference is positive if the third permanent component is less than the historical average number of tickets that were sold over the first time period for past airline flights that have departed from either the departure market or the one or more other markets at either the departure time or the one or more other departure times, and that have departed on the day of the week, in the month, or in the quarter;

instructions for determining a fourth forecast of the number of tickets that will be sold for the future airline flight, the third forecast being based on the third permanent component, the third trend component, and the third seasonal component; and instructions for determining the ratio, wherein the ratio equals the quotient of the first forecast divided by the fourth forecast.

* * * * *